(12) United States Patent
Chuang et al.

(10) Patent No.: US 11,638,027 B2
(45) Date of Patent: Apr. 25, 2023

(54) PATTERN-BASED MOTION VECTOR DERIVATION FOR VIDEO CODING

(71) Applicant: HFI Innovation, Inc., Zhubei (TW)

(72) Inventors: Tzu-Der Chuang, Zhubei (TW); Ching-Yeh Chen, Taipei (TW); Chih-Wei Hsu, Hsinchu (TW); Yu-Wen Huang, Taipei (TW)

(73) Assignee: HFI Innovation, Inc., Zhubei (TW)

( * ) Notice: Subject to any disclaimer, the term of this patent is extended or adjusted under 35 U.S.C. 154(b) by 0 days.

(21) Appl. No.: 15/670,109

(22) Filed: Aug. 7, 2017

(65) Prior Publication Data
US 2018/0041769 A1 Feb. 8, 2018

Related U.S. Application Data

(60) Provisional application No. 62/371,879, filed on Aug. 8, 2016.

(51) Int. Cl.
*H04N 19/176* (2014.01)
*H04N 19/513* (2014.01)
(Continued)

(52) U.S. Cl.
CPC ........ *H04N 19/513* (2014.11); *H04N 19/176* (2014.11); *H04N 19/44* (2014.11); *H04N 19/573* (2014.11)

(58) Field of Classification Search
CPC .. H04N 19/176; H04N 19/573; H04N 19/513; H04N 19/44
See application file for complete search history.

(56) References Cited

U.S. PATENT DOCUMENTS 9,635,386 B2   4/2017 Hendry et al.
2003/0152149 A1* 8/2003 Denolf ............... H04N 19/61
                                              375/E7.093
(Continued)

FOREIGN PATENT DOCUMENTS

CN   101415122 A   4/2009
CN   102204254 A   9/2011
(Continued)

OTHER PUBLICATIONS

[No. Author Listed], Algorithm Description of Joint Exploration Test Model 6 (JEM6). Joint Video Exploration Team (JVET) Document JVET-F1001. Mar. 31-Apr. 7, 2017; 49 pages.
(Continued)

*Primary Examiner* — Md N Haque
*Assistant Examiner* — Berteau Joisil
(74) *Attorney, Agent, or Firm* — Wolf, Greenfield & Sacks, P.C.

(57) ABSTRACT

The techniques described herein relate to methods, apparatus, and computer readable media configured to receive compressed video data, wherein the compressed video data is related to a set of frames. A decoder-side predictor refinement technique is used to calculate a new motion vector for a current frame from the set of frames, wherein the new motion vector estimates motion for the current frame based on one or more reference frames. An existing motion vector associated with a different frame from a motion vector buffer is retrieved. The new motion vector is calculated based on the existing motion vector using a decoder-side motion vector prediction technique, such that the existing motion vector is in the motion vector buffer after calculating the new motion vector.

19 Claims, 8 Drawing Sheets

(51) Int. Cl.
*H04N 19/44* (2014.01)
*H04N 19/573* (2014.01)

(56) References Cited

U.S. PATENT DOCUMENTS

| | | | |
|---|---|---|---|
| 2006/0088102 | A1 | 4/2006 | Lee et al. |
| 2006/0256866 | A1* | 11/2006 | Ziauddin ............... H04N 19/51 375/240.03 |
| 2008/0043842 | A1 | 2/2008 | Nakaishi |
| 2009/0238276 | A1 | 9/2009 | Har-Noy et al. |
| 2010/0284464 | A1 | 11/2010 | Nagori et al. |
| 2011/0080954 | A1* | 4/2011 | Bossen ............... H04N 19/573 375/E7.125 |
| 2011/0176611 | A1 | 7/2011 | Huang et al. |
| 2012/0075535 | A1* | 3/2012 | Van Beek ............. H04N 5/145 348/699 |
| 2012/0294370 | A1 | 11/2012 | Chiu et al. |
| 2012/0320969 | A1 | 12/2012 | Zheng et al. |
| 2013/0022119 | A1 | 1/2013 | Chien et al. |
| 2013/0195188 | A1 | 8/2013 | Sugio et al. |
| 2013/0243093 | A1 | 9/2013 | Chen et al. |
| 2015/0022633 | A1 | 1/2015 | Zhang et al. |
| 2015/0131739 | A1 | 5/2015 | Lee et al. |
| 2016/0012855 | A1 | 1/2016 | Krishnan |
| 2017/0318304 | A1 | 11/2017 | Sanghvi et al. |
| 2017/0347128 | A1* | 11/2017 | Panusopone ......... H04N 19/172 |
| 2018/0192071 | A1 | 7/2018 | Chuang et al. |
| 2019/0037216 | A1 | 1/2019 | Cho |
| 2019/0141334 | A1 | 5/2019 | Lim et al. |

FOREIGN PATENT DOCUMENTS

| | | |
|---|---|---|
| CN | 102598670 A | 7/2012 |
| CN | 102611886 A | 7/2012 |
| CN | 102710934 A | 10/2012 |
| CN | 103460695 A | 12/2013 |
| WO | WO 2012/045225 A1 | 4/2012 |
| WO | WO 2016/078511 | 5/2016 |

OTHER PUBLICATIONS

Alshina et al., Bi-Directional Optical Flow (JCTVC-C204). Oct. 7-15, 2010;7 pages.

Aslhina et al., Known Tools Performance Investigation for Next Generation Video Coding (VCEG-AZ05). Jun. 19-26, 2015;16 pages.

Huang et al., A 249MPixel/s HEVC video-decoder chip for Quad Full HD applications. Digest of Technical Papers. IEEE International Solid-State Circuits Conference (ISSCC). Feb. 2013;162-3.

Marpe et al., Context-Based Adaptive Binary Arithmetic Coding in the H.264/AVC Video Compression Standard. IEEE Transactions on Circuits and Sytems for Video Technology. Jul. 2003;13(7): 620-36.

PCT/CN2017/096382, Oct. 27, 2017, International Search Report and Written Opinion.

International Search Report and Written Opinion for International Application No. PCT/CN2018/071518 dated Mar. 26, 2018.

Chen et al., Decoder-Side Motion Vector Refinement Based on Bilateral Template Matching. Joint Video Exploration Team (JVET) Document JVET-D0029. Oct. 15-Oct. 21, 2016; 4 pages.

Chiu et al., Decoder-side Motion Estimation and Wiener filter for HEVC. Intel Corporation. Dec. 31, 2016. 6 pages.

Qu et al., A frame rate up-conversion method with quadruple motion vector post-processing. IEEE. 2016. 1686-90.

Extended European Search Report for European Application No. 18735922.9 dated Mar. 31, 2020.

Chen et al., Algorithm Description of Joint Exploration Test Model 4. Joint Video Exploration Team (JVET) of ITU-T SG16 WP3 and ISO/IEC JTC1/SC29/WG11, 4th Meeting: Chengdu, CN, Oct. 15-21, 2016, Document JVET-D1001v1. Oct. 28, 2016;1:38 pages.

Chen et al., EE3: Decoder-Side Motion Vector Refinement Based on Bilateral Template Matching. Joint Video Exploration Team (JVET) of ITU-T SG16 WP3 and ISO/IEC JTC1/SC29/WG11, 4th Meeting: Chengdu, CN, Oct. 15-21, 2016, Document JVET-E0052. Jan. 3, 2017:4 pages.

Chiu et al., CE1: Report of self derivation of motion estimation in TMuC 0.9. Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document JCTVC-D167. Jan. 16, 2011:14 pages.

U.S. Appl. No. 15/861,476, filed Jan. 3, 2018, Chuang et al.

EP 18735922.9, Mar. 31, 2020, Extended European Search Report.

UEDA, CE1: Refinement Motion Compensation using DMVD with merge extension. Joint Collaborative Team on Video Coding (JCT-VC) of ITU-T SG16 WP3 and ISO/IEC JTC1/SC29/WG11 JCT1/SC29/WG11. JCTVC-D120. Jan. 2011. 13 pages.

International Search Report and Written Opinion dated Oct. 27, 2017 in connection with International Application No. PCT/CN2017/096382.

\* cited by examiner

PATTERN-BASED MOTION VECTOR DERIVATION FOR VIDEO CODING

RELATED APPLICATIONS

This Application claims priority under 35 U.S.C. § 119(e) to U.S. Provisional Application Ser. No. 62/371,879, entitled "METHODS OF PATTERN-BASED MV DERIVATION FOR VIDEO CODING" filed on Aug. 8, 2016, which is herein incorporated by reference in its entirety.

TECHNICAL FIELD

The techniques described herein relate generally to video coding, and particularly to motion vector restoration for decoder-side predictor refinement.

BACKGROUND OF INVENTION

Video coding involves compressing (and decompressing) a digital video signal. Examples of video coding standards include the H.264 video compression standard, and its successor High Efficiency Video Coding (HEVC). Moving video is formed by taking snapshots of the signal at periodic time intervals, such that playing back the series of snapshots, or frames, produces the appearance of motion. Video encoders include a prediction model that attempts to reduce redundancy using similarities between neighboring video frames. A predicted frame is created from one or more past or future frames that are often referred to as reference frames. Frames that do not serve as reference frames are often referred to as non-reference frames.

Since each frame can include thousands or millions of pixels, video coding techniques typically do not process all of a frame's pixels at once. Therefore, a coded frame is divided into blocks that are often referred to as macroblocks. Instead of directly encoding the raw pixel values for each block, the encoder tries to find a block similar to the one it is encoding in a reference frame. If the encoder finds a similar block, the encoder can encode that block using a motion vectors, which is a two-dimensional vector that points to the matching block in the reference frame.

Some techniques explicitly signal motion information to the decoder. Examples of such modes include merge mode and advanced motion vector prediction (AMVP) mode in High Efficiency Video Coding (HEVC). However, having to signal motion vectors can consume a significant amount of data that could otherwise be used by the transmitter to encode other information. Therefore, decoder-side motion vector refinement tools can be used to refine, predict, and/or generate motion information such that the motion information can be derived without being explicitly signaled.

SUMMARY OF INVENTION

In accordance with the disclosed subject matter, apparatus, systems, and methods are provided for decoder-side predictor refinement techniques that improve the execution speed and efficiency of the refinement techniques.

Some embodiments relate to a decoding method for decoding video data. The method includes receiving compressed video data, wherein the compressed video data is related to a set of frames. The method includes calculating, using a decoder-side predictor refinement technique, a new motion vector for a current frame from the set of frames, wherein the new motion vector estimates motion for the current frame based on one or more reference frames, including retrieving an existing motion vector associated with a different frame from a motion vector buffer, and calculating the new motion vector based on the existing motion vector using a decoder-side motion vector prediction technique, such that the existing motion vector is in the motion vector buffer after calculating the new motion vector.

In some examples, the new motion vector is a refined motion vector, and calculating includes storing the new motion vector in the motion vector buffer during a first step, and storing the existing motion vector back to the motion vector buffer.

In some examples, the new motion vector is a refined motion vector, and calculating comprises storing the new motion vector in a second motion vector buffer so that the existing motion vector remains in the motion vector buffer.

In some examples, the method includes determining data from one or more upper coding tree unit (CTU) rows are available, and calculating comprises retrieving motion vectors for a set of neighboring blocks, including, for one or more neighboring blocks from the set of neighboring blocks, determining the neighboring block is in the one or more upper CTU rows, and retrieving one or more new motion vectors associated with the neighboring block.

In some examples, calculating includes testing one or more motion vectors pairs derived from a first set of reference frames and a second set of reference frames, and storing only one of the motion vectors pair associated with the first set of reference frames and the second set of reference frames.

In some examples, calculating includes testing one or more motion vectors pairs derived from a first set of reference frames, or a second set of reference frames, but not both.

In some examples, the method includes receiving a signal indicative of a starting candidate index for a starting motion vector candidate list, and using the received signal to calculate the new motion vector.

In some examples, the method includes receiving a signal indicative of a starting candidate index for a starting motion vector candidate list, a coarse grain motion vector difference, or both, and using the received signal to calculate the new motion vector.

In some examples, the method includes receiving a signal from an advanced motion vector prediction indicative of the starting motion vector, and using the received signal to calculate the new motion vector.

Some embodiments relate to an apparatus configured to decode video data, the apparatus comprising a processor in communication with memory, the processor being configured to execute instructions stored in the memory that cause the processor to receive compressed video data, wherein the compressed video data is related to a set of frames, and calculate, using a decoder-side predictor refinement technique, a new motion vector for a current frame from the set of frames, wherein the new motion vector estimates motion for the current frame based on one or more reference frames. Calculating includes retrieving an existing motion vector associated with a different frame from a motion vector buffer, and calculating the new motion vector based on the existing motion vector using a decoder-side motion vector prediction technique, such that the existing motion vector is in the motion vector buffer after calculating the new motion vector.

In some examples the motion vector is a refined motion vector, and calculating includes storing the new motion vector in the motion vector buffer during a first step, and storing the existing motion vector back to the motion vector buffer.

In some examples, the new motion vector is a refined motion vector, and calculating comprises storing the new motion vector in a second motion vector buffer so that the existing motion vector remains in the motion vector buffer.

In some examples, the instructions further cause the processor to determine data from one or more upper coding tree unit (CTU) rows are available, and calculate comprises retrieving motion vectors for a set of neighboring blocks, including, for one or more neighboring blocks from the set of neighboring blocks, determining the neighboring block is in the one or more upper CTU rows, and retrieving one or more new motion vectors associated with the neighboring block.

In some examples, calculating includes testing one or more motion vectors pairs derived from a first set of reference frames and a second set of reference frames, and storing only one of the motion vectors pair associated with the first set of reference frames and the second set of reference frames.

In some examples, calculating includes testing one or more motion vectors pairs derived from a first set of reference frames, or a second set of reference frames, but not both.

In some examples, the instructions further cause the processor to receive a signal indicative of a starting candidate index for a starting motion vector candidate list, and use the received signal to calculate the new motion vector.

In some examples, the instructions further cause the processor to receive a signal indicative of a starting candidate index for a starting motion vector candidate list, a coarse grain motion vector difference, or both, and use the received signal to calculate the new motion vector.

In some examples, the instructions further cause the processor to receive a signal from an advanced motion vector prediction indicative of the starting motion vector, and use the received signal to calculate the new motion vector.

Some embodiments relate to at least one non-transitory computer-readable storage medium encoded with a plurality of computer-executable instructions that, when executed, perform a method including receiving compressed video data, wherein the compressed video data is related to a set of frames, and calculating, using a decoder-side predictor refinement technique, a new motion vector for a current frame from the set of frames, wherein the new motion vector estimates motion for the current frame based on one or more reference frames. Calculating includes retrieving an existing motion vector associated with a different frame from a motion vector buffer, and calculating the new motion vector based on the existing motion vector using a decoder-side motion vector prediction technique, such that the existing motion vector is in the motion vector buffer after calculating the new motion vector.

Some embodiments relate to an encoding method for encoding video data, the method comprising transmitting compressed video data to a receiving device, wherein the compressed video data is related to a set of frames. The compressed video data comprises a field used by the receiving device to decode the compressed video data. The compressed video data and the field cause the receiving device or video encoder to calculate, using a decoder-side predictor refinement technique and the field, a new motion vector for a current frame from the set of frames, wherein the new motion vector estimates motion for the current frame based on one or more reference frames, comprising retrieving an existing motion vector associated with a different frame from a motion vector buffer, and calculating the new motion vector based on the existing motion vector using a decoder-side motion vector prediction technique, such that the existing motion vector is in the motion vector buffer after calculating the new motion vector.

In some examples, the field signals a starting candidate for the decoder-side predictor refinement technique. The decoder-side predictor refinement technique can be PMVD.

In some examples, the field signals the merge index for bilateral matching merge mode, template matching merge mode, or both. The field can signal a best starting motion vectors in a first set of reference frames and a second set of reference frames. The field can signal two motion vector pairs, wherein one pair is derived from a first set of reference frames and one pair is derived from a second set of reference frames.

In some examples, the field can be associated with a motion vector predictor mode and used to signal whether to apply the decoder-side motion vector predictor technique, such that the field signals a starting motion vector for the decoder-side predictor refinement technique.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Figure 1:
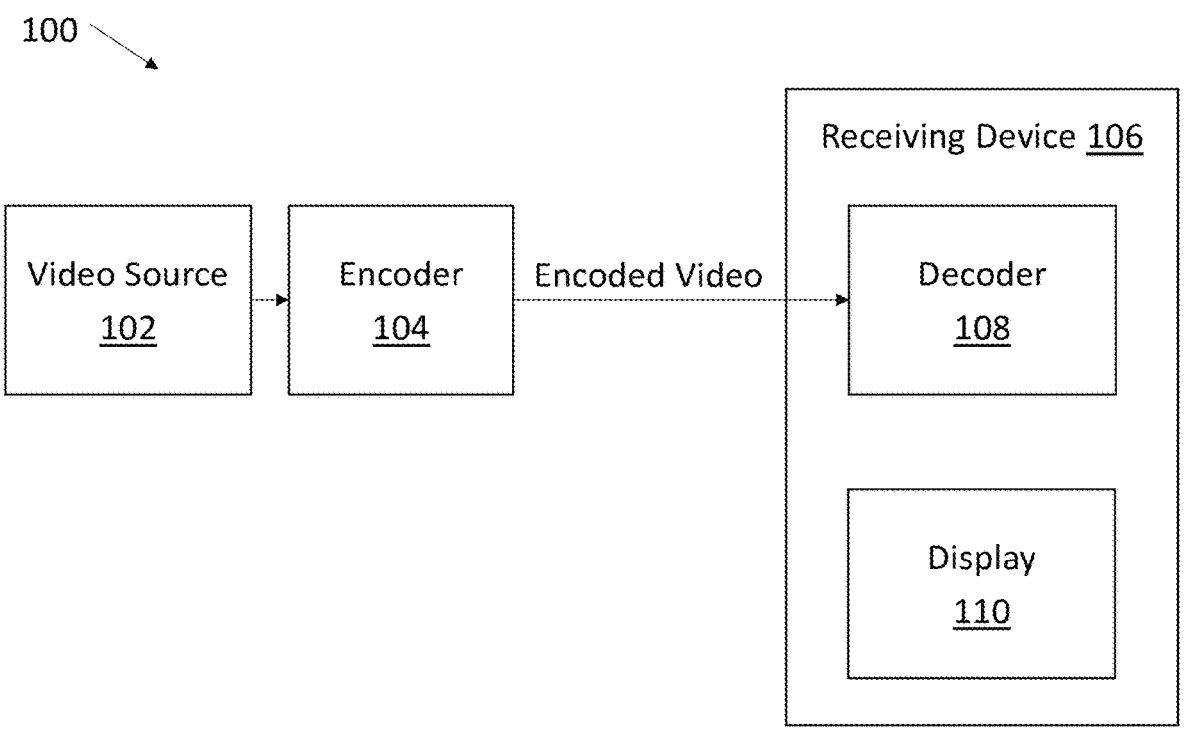
FIG. 1 shows an exemplary video coding configuration.

The inventors have recognized and appreciated that various techniques can be used to improve the execution of decoder-side predictor refinement techniques, such as pattern-based motion vector derivation, bi-directional optical flow (BIO), and decoder-side motion vector refinement (DMVR). Decoder-side predictor refinement tools can cause processing delays due to how the motion vectors are computed and reconstructed. The techniques described herein can allow for similar execution timing as compared to the execution of traditional decoding methods that do not predict motion vectors (e.g., such as when the motion vector information is signaled from the encoder). For example, decoder-side predictor refinement techniques can be adjusted so that the motion vectors can be reconstructed early in the process, thereby allowing the decoder to pre-fetch the requisite reference pixels in a manner that hides the latency cycles required to fetch the data. Otherwise, if the decoder could not reconstruct the motion vectors early in the process, the decoder could not pre-fetch the reference data, which would typically cause a significant delay in execution throughput.

Described herein are techniques for allowing the decoder to pre-fetch reference data for decoder-side predictor refinement techniques in a manner that still hides the latency cycles. In some examples, the unrefined motion vector (MV) is (a) restored back into the MV buffer and/or (b) not changed, so that the unrefined MV can be used by the decoder-side MV refinement tools or used to derive the reference motion vector or the motion vector candidates (e.g. the merge candidate list and the advance motion vector predictor list) for the following blocks. For pattern-based motion vector derivation (PMVD), the starting MV can be explicitly signaled by deriving a candidate list and signaling a candidate index. The MV can be derived in parsing stage without the influence of the decoder-side MV refinement tools, allowing the decoder to still pre-fetch the requisite information from the MV buffer. The decoder can use the signaled starting MV for merge candidate derivation and advanced motion vector prediction (AMVP) candidate derivation of the neighboring blocks. In some examples, a coding tree unit (CTU)-row constraint can be incorporated so that the decoder can reference the modified MVs in the upper CTU-row.

In some examples, the decoder can be configured to not reference the MV of a PMVD coded block. In some examples, both (a) the starting MV and (b) the coarse grain motion vector difference (MVD) can be signaled. In some examples, the starting MV can be signaled by the AMVP mode (e.g., instead of a candidate list). Also described herein are techniques that can be used to store the MV pair, such as for bilateral matching merge mode. In some embodiments, the decoder tests both the MV pair derived from LIST_0 and LIST_1, but only stores one MV pair. In some embodiments, the decoder only tests one MV pair derived from one list, and stores the MV pair of the tested list. These and other techniques will be examined more fully in the description that follows.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Video source 102 is a video source, and can be, for example, digital television, internet-based video, video calling, and/or the like. Encoder 104 encodes the video source into encoded video. The encoder 104 can reside on the same device that generated the video source 102 (e.g., a cell phone, for video calling), and/or may reside on a different device. The receiving device 106 receives encoded video from the encoder 104. The receiving device 104 may receive the video as a video product (e.g., a digital video disc, or other computer readable media), through a broadcast network, through a mobile network (e.g., a cellular network), and/or through the Internet. The receiving device 106 can be, for example, a computer, a cell phone, or a television. The receiving device 106 includes a decoder 108 that is configured to decode the encoded video. The receiving device 106 also includes a display 110 for displaying the decoded video.

As explained above, part of the decoding process relies on motion vectors. In examples when the encoder (e.g., encoder 104) does not include the final MV information directly in the encoded video, the decoder (e.g., decoder 108 in the receiving device 106) can employ receiver-side prediction tools, often called receiver-side predictor refinement tools or decoder-side predictor refinement tools. An example of a receiver-side predictor refinement tool is Pattern-based Motion Vector Derivation (PMVD) mode, which may also be referred to as Frame Rate Up-Conversion (FRUC) mode. PMVD is described in, for example, Joint Video Exploration Team (WET) Document WET-F1001, entitled Algorithm Description of Joint Exploration Test Model 6 (JEM 6), which is hereby incorporated by reference herein in its entirety.

Other examples of decoder-side predictor refinement tools include bi-directional optical flow (BIO) and decoder-side motion vector refinement (DMVR). For example, BIO was proposed by Samsung in the third JCTVC meeting and 52th VCEG meeting, and it is disclosed in the documents, JCTVC-C204 and VECG-AZ05. See, e.g., Elena Alshina and Alexander Alshin, Bi-Directional Optical Flow, Oct. 7-15, 2010 (JCTVC-C204) (including the two attached Microsoft Excel spreadsheets), and E. Alshina et al., Known Tools Performance Investigation for Next Generation Video Coding, Jun. 19-26, 2015 (VCEG-AZ05) (including the Microsoft PowerPoint presentation), the contents of both of which are hereby incorporated by reference in their entirety. BIO utilizes the assumptions of optical flow and steady motion to achieve the sample-level motion refinement. It is typically applied only for truly bi-directional predicted blocks, which is predicted from two reference frames and one is the previous frame and the other is the latter frame. In VECG-AZ05, BIO utilizes one 5×5 window to derive the motion refinement of one sample, so for one N×N block, the motion compensated results and corresponding gradient information of one (N+4)×(N+4) block are required to derive the sample-based motion refinement of current block. And one 6-Tap gradient filter and one 6-Tap interpolation filter are used to generate the gradient information in BIO. Therefore, the computational complexity of BIO is much higher than that of traditional bi-directional prediction. For additional information, see D. Marpe, H. Schwarz, and T. Wiegand: Context-Based Adaptive Binary Arithmetic Coding in the H.264/AVC Video Compression Standard, IEEE Transactions on Circuits and Systems for Video Technology, Vol. 13, No. 7, pp. 620-636, July 2003, incorporated by reference herein in its entirety. PMVD itself can be performed using different modes such as, for example, bi-lateral matching merge mode or template matching merge mode. Typically, which mode for the decoder to use is signaled in the encoded video. Thus the encoder signals to the decoder to use PMVD mode, and also signals which particular PMVD mode. In some examples, a FRUC_mrg_flag is signaled when the merge_flag or skip_flag is true. If the FRUC_mrg_flag is 1, then a FRUC_merge_mode is signaled to indicate whether the bilateral matching merge mode (e.g., described further in conjunction with FIGS. 2-4) or template matching merge mode (e.g., described further in conjunction with FIG. 5) is selected.

In summary, both PMVD modes use decoded pixels to derive the motion vector for the current block. A new temporal motion vector prediction (MVP) called temporal derived MVP is derived by scanning all MVs in all reference frames. A picture often refers to a number of frames (e.g., one picture includes sixteen frames). Those reference frames are put into one or two reference picture list. For P-slice, only one reference picture list is used. For the B-slice, two reference picture lists are used. Generally, for the B-slice, two reference picture lists are used to store past and future pictures, which are often referred to as LIST_0 for past pictures and LIST_1 for future pictures.

Figure 2:
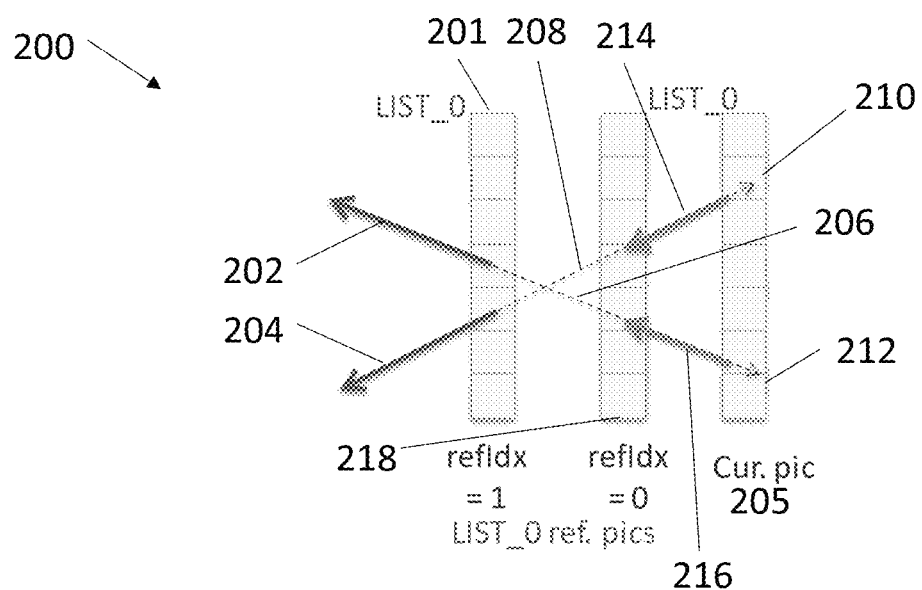
FIG. 2 shows an example technique for deriving the temporal derived motion vector predictions (MVPs).

To derive the LIST_0 temporal derived MVP, for each LIST_0 MV in the LIST_0 reference frames, the MV is scaled to point to the current frame. The block that is pointed by the scaled MV in the current frame is the target current block. The MV is further scaled to point to the reference picture for which refIdx is equal to 0 in LIST_0 for the target current block. The further scaled MV is stored in the LIST_0 MV field for the target current block. FIG. 2 shows an example 200 of deriving the temporal derived MVPs. The decoder scans all the LIST_0 MVs in LIST_0 reference pictures for which the refIdx is equal to 1. For a LIST_0 MV (shown by arrows 202, 204), a scaled MV that points to the current picture is derived for each LIST_0 MV (shown by dotted arrows 206 and 208 for reference picture 201). A 4×4 block 210, 212 in the current picture 205 is pointed to by each of the scaled MVs. Then, another scaled MV 214, 216 is assigned to the pointed 4×4 blocks 210, 212, respectively, in current picture where the scaled MV 214, 216 is along the associated scaled MV 202, 204 but the start point is the current picture 205 and the end point is the reference picture 218 with refIdx equal to 0 in LIST_0. The decoder scans all the MVs in all 4×4 blocks in all reference pictures to generate the temporal derived LIST_0 and LIST_1 MVPs of current frame. For each MV, the MV is scaled to get the crossed block in current picture. The decoder then calculates the scaled MVP and assigns it to the crossed block (as shown as the block pointed by the dotted arrows 206, 208).

Figure 3:
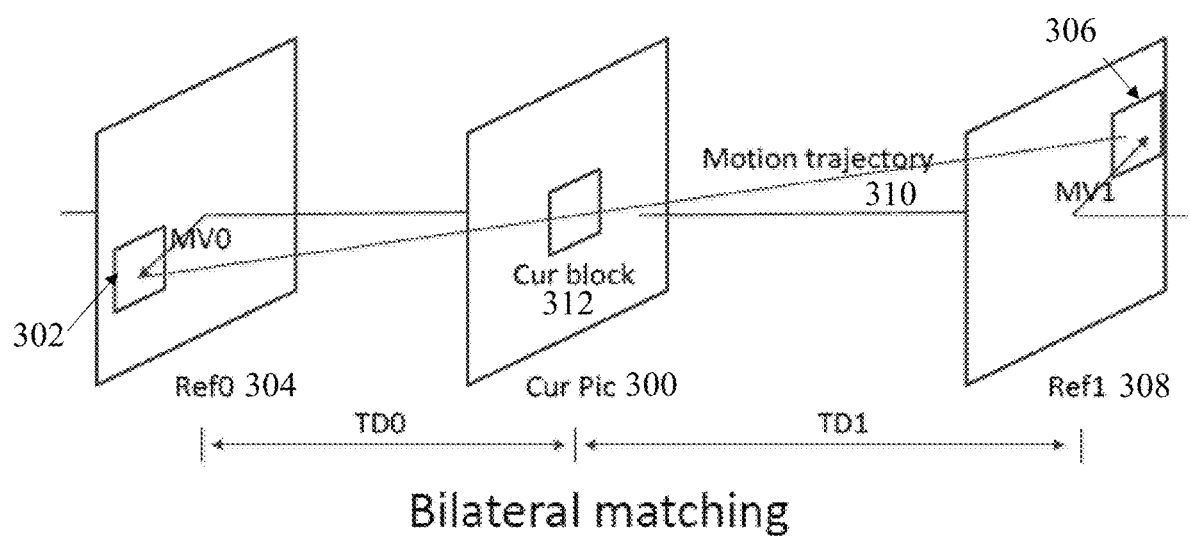
FIG. 3 shows an example technique of pattern-based motion vector derivation (PMVD) using bi-lateral matching merge mode.

FIG. 3 shows an example of PMVD bilateral matching merge mode. For bi-lateral matching, the decoder finds the two most similar reference blocks in LIST_0 and LIST_1 that lie in the same trajectory. As shown in FIG. 3, for the current picture (or "cur pic") 300 the decoder selects one macroblock (or "block") 302 in reference frame Ref0 304 from LIST_0 and a second block 306 in reference frame Ref1 308 from LIST_1. The decoder essentially assumes motion is constant, and uses the middle point of both macroblocks to generate motion trajectory 310. The decoder uses the motion trajectory 310 to find the current prediction macroblock (or "block") 312 in cur pic 300. The decoder calculates the difference between block 302 and block 306. If there is only a small difference, then the decoder knows that the blocks are very similar. In some examples, the decoder can calculate the sum of absolute distance (or "SAD") to calculate the difference between the two blocks. The decoder changes the motion trajectory to minimize the difference between the blocks.

Figure 4:
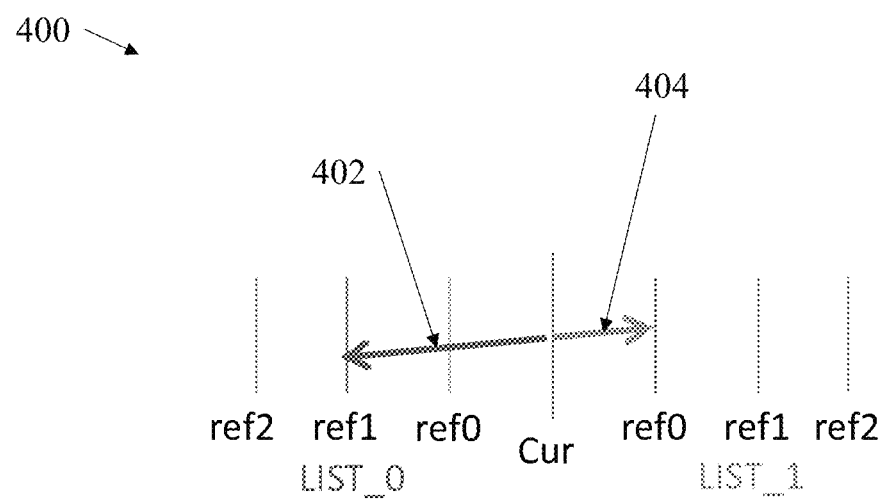
FIG. 4 shows an example of scaling a motion trajectory.

The decoder constructs the starting motion vector (MV) list in LIST_0 and LIST_1, respectively. The decoder uses eleven candidates for the list, including seven MVs of merge candidates and four temporally derived MV predictions (or MVPs). The decoder evaluates these eleven candidates to select the best starting point. In particular, the decoder searches for a pair across the two neighboring frames. When considering the candidates for each list, the decoder analyzes the 22 motion vectors to derive 22 motion vector pairs. The decoder generates the MV pairs by scaling the motion trajectory. For each MV in one list, a MV pair is generated by composing of this MV and the mirrored MV that is derived by scaling the MV to the other list. For each MV pair, two reference blocks are compensated by using this MV pair. FIG. 4 shows an example 400 of scaling a motion trajectory. In particular, the motion trajectory 402 from the Cur pic to ref1 in LIST_0 is scaled as shown with motion trajectory 404 from Cur pic to ref0 in LIST_1. The decoder calculates a cost for each of the 22 motion vector pairs (e.g., using SAD) and selects the MV pair with the smallest cost as the starting point of bilateral matching merge mode.

The decoder next refines the selected MV pair. The decoder searches different blocks around the starting point to decide which block is the best match. In some examples, the current PU is divided into sub-PUs. The depth of sub-PU is signaled in sequence parameter set, SPS (e.g. 3). In some examples, the minimum sub-PU size is a 4×4 block. For each sub-PU, several starting MVs in LIST_0 and LIST_1 are selected, which includes MVs of PU-level derived MV, zero MV, HEVC collocated TMVP of current sub-PU and bottom-right block, temporal derived MVP of current sub-PU, and MVs of left and above PUs/sub-PUs. By using the similar mechanism in PU-level searching, the best MV pair for the sub-PU is selected. In some examples, the decoder uses a Diamond Search algorithm to search the different blocks. Then the final MV pair is used as the PU-level and sub-PU-level best MV pair.

In summary, in some examples the bilateral matching merge mode uses the MV lists first, evaluates the candidate MV pairs to get starting MV pair, and then refines the pair to determine the ultimate best MV pair.

Figure 5:
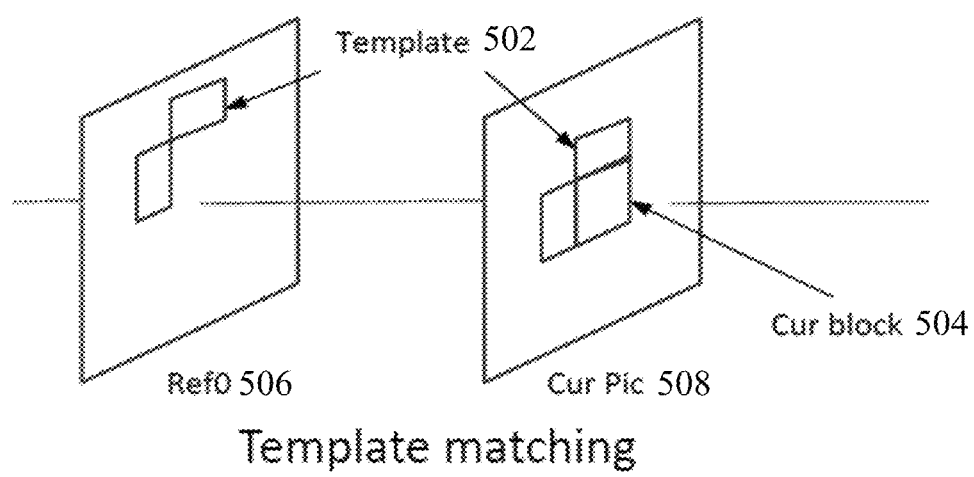
FIG. 5 shows an example technique of pattern-based motion vector derivation (PMVD) using template matching merge mode.

For template matching merge mode, the assumption is that for the decoder to decode the current block, the decoder can use the neighboring block using a template to find a best match. So the decoder can use the neighboring block to find a best match, and then uses the best match motion vector. FIG. 5 shows an example technique for template matching merge mode. Referring to FIG. 5, the template 502 includes the reconstructed pixels from four rows above the current block 504 and from four columns to the left of the current block 504 to perform the matching in Ref 0 506 for Cur Pic 508. Therefore, unlike bilateral matching merge mode, template matching merge mode does not use two reference frames—it just uses one reference frame.

Like bilateral matching merge mode, two-stage matching is also applied for template matching. In the PU-level matching, eleven starting MVs in LIST_0 and LIST_1 are selected respectively. These MVs include seven MVs from merge candidates and four MVs from temporal derived MVPs. Two different staring MV sets are generated for two lists. For each MV in one list, the SAD cost of the template with the MV is calculated. The MV with the smallest cost is the best MV. Then, the diamond search is performed to refine the MV. The refinement precision is ⅛-pel.

The refinement search range is restricted within ±8 pixels. The final MV is the PU-level derived MV. The MVs in LIST_0 and LIST_1 are generated independently.

For the second stage, sub-PU-level searching, the current PU is divided into sub-PUs. The depth of sub-PU is signaled in SPS (e.g. 3). Minimum sub-PU size is 4×4 block. For each sub-PU at left or top PU boundaries, several starting MVs in LIST_0 and LIST_1 are selected, which includes MVs of PU-level derived MV, zero MV, HEVC collocated TMVP of current sub-PU and bottom-right block, temporal derived MVP of current sub-PU, and MVs of left and above PUs/sub-PUs. By using the similar mechanism in PU-level searching, the best MV pair for the sub-PU is selected. The diamond search is performed to refine the MV pair. The motion compensation for this sub-PU is performed to generate the predictor for this sub-PU. For those PUs which are not at left or top PU boundaries, the second stage, sub-PU-level searching, is not applied, and the corresponding MVs are set equal to the MVs in the first stage.

Figure 6:
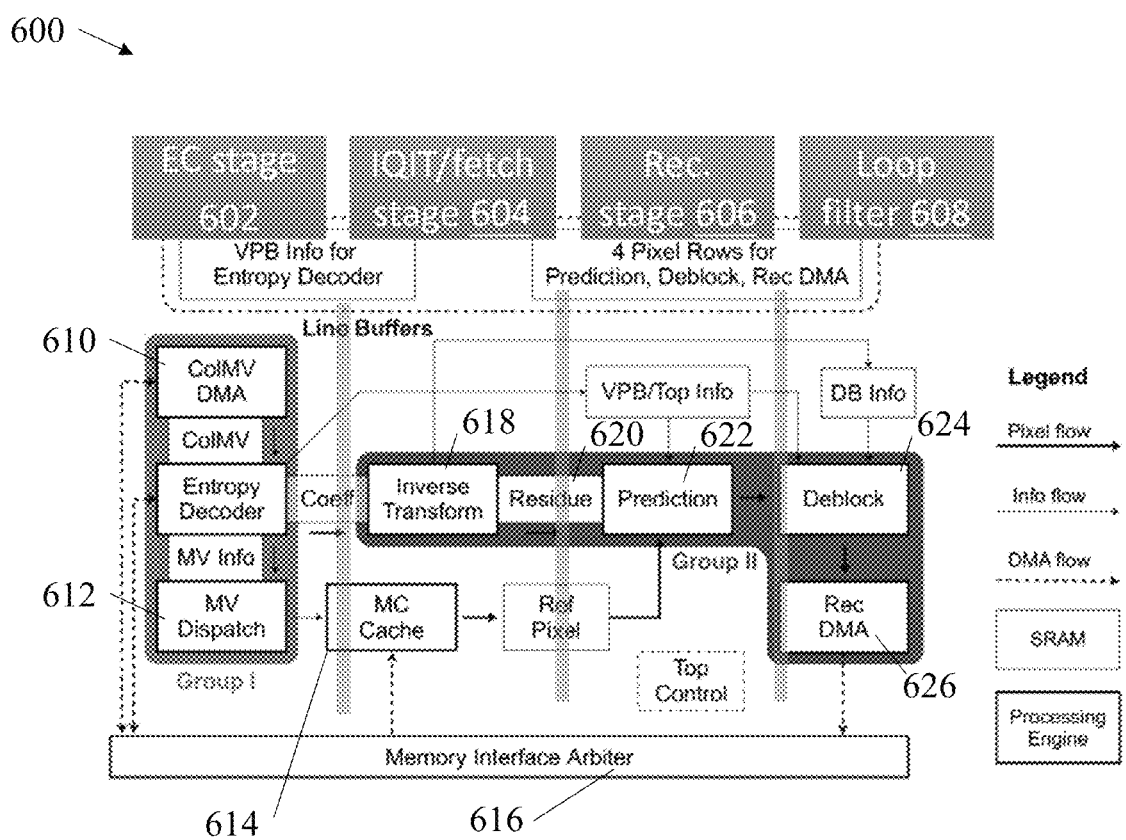
FIG. 6 shows an exemplary decoder architecture.

FIG. 6 shows an exemplary decoder architecture 600, according to some embodiments. The Entropy Decoder includes, e.g., a CABAC or CAVLC entropy decoder, which parses the syntaxes from the bitstream. The ColMV DMA 610 stores the collocated temporal MVs. The MV Dispatch 612 reconstructs the MVs of the blocks and issues the memory fetch instruction to the MC cache 614 and DRAM (not shown) through the memory interface arbiter 616. The Inverse Transform 618 includes inverse quantization and inverse transform (IQIT) that generates the reconstructed residual 620. Prediction block 622 generates the inter motion compensation and intra prediction predictors. Deblock 624 is to reduce the block artifact and the Rec DMA 626 stores the reconstructed pixels to the external DRAM. Further detail of exemplary components of this architecture is discussed in C.-T. Huang et al., "A 249MPixel/s HEVC video-decoder chip for Quad Full HD applications," Digest of Technical Papers IEEE International Solid-State Circuits Conference (ISSCC), pp. 162-163, February 2013, which is hereby incorporated by reference herein in its entirety. Of note, the architecture is broken up into four stages in order to pipeline the architecture: the EC stage 602, the IQIT (inverse quantization and inverse transform)/fetch stage 604, the reconstruction stage 606 and the loop filter stage 608. In HEVC and H.264, the final MV can be derived in both the EC stage 602 (which includes parsing) and the reconstruction stage 606. In some implementations, the decoder derives the final MV in the parsing stage, and pre-fetches the required reference pixel data in the parsing stage (EC stage 602). This can be done, for example, to reduce/hide the DRAM access time.

Figure 7:
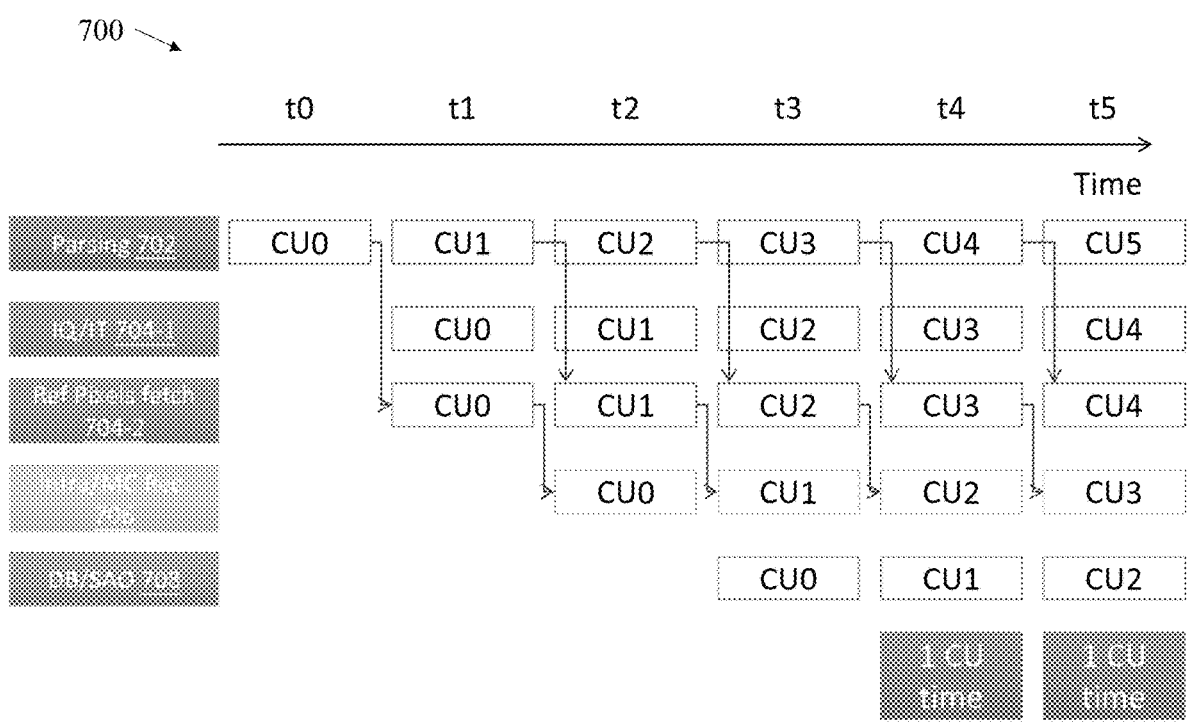
FIG. 7 shows an example of a decoder pipeline execution when executing a decoder architecture, such as the decoder architecture shown in FIG. 6.

FIG. 7 shows an example of a decoder pipeline execution 700 when executing a decoder architecture, such as the decoder architecture shown in FIG. 6, according to some embodiments. FIG. 7 includes the parsing stage 702, during which the motion vectors are reconstructed as described above. The IQ/IT stage 704-1 generates the reconstructed residual for the current block. The Reference Pixels Fetch stage 704-2 fetches reference pixel data from memory. Reference frames are often stored in external memory, such as DRAM. Thus, if the decoder wants to do motion compensation on a reference frame, the decoder first needs to go to external memory to retrieve the reference data. Typically a lot of latency time is required to get data from external memory. The Intra/MC (Motion Compensation) reconstruction stage 706 performs the prediction. The deblocking (DB)/Sample Adaptive Offset (SAO) stage 708 performs in-loop filtering process to improve the quality of the decoded frame.

Generally, the decoder first decodes CU0, then CU1 and so forth. To give an example using CU0, at t0, the decoder decodes CU0 in the parsing stage 702 including reconstructing the MVs. Then, at t1 CU0 moves to IQ/IT stage 704-1. In order to do motion compensation in the Intra/MC Reconstruction stage 706, the decoder needs to do a pre-fetch in the previous stage (the Ref Pixels fetch stage 704-2).

As can be seen in FIG. 7, in order to hide the delay time to fetch data from memory (e.g., so it does not affect the pipeline execution), since the decoder needs to know the motion vector prior to reconstruction performed in the Intra/MC Reconstruction stage 706, the data is pre-fetched in the Ref Pixels fetch stage 704-2 and stored in local memory (e.g., SRAM or cache memory). For example, in the MPEG-2/4, H.264/AVC, and HEVC video decoder, the MVs can be reconstructed in the parsing stage. According to the reconstructed MVs, the required reference pixels can be fetched from the DRAM and stored in the local memory, e.g. SRAM or cache memory. In the Intra/MC Reconstruction stage 706, the reference data can be loaded from the local memory without latency cycles.

However, decoder-side predictor refinement tools use the neighboring block(s) to derive the motion vector (e.g., PMVD, such as how template matching merge mode uses the neighboring block to derive motion vector). However, the template block is not generated until the third stage (the Intra/MC Reconstruction stage 706). For example, when PMVD is applied, the final MVs of a PMVD coded block depend on the PMVD searching process in the Intra/MC Reconstruction stage 706, which means the MVs cannot be reconstructed in the Parsing stage 702, and therefore the data pre-fetch is not feasible at stage Ref Pixels fetch 704-2.

Figure 8:
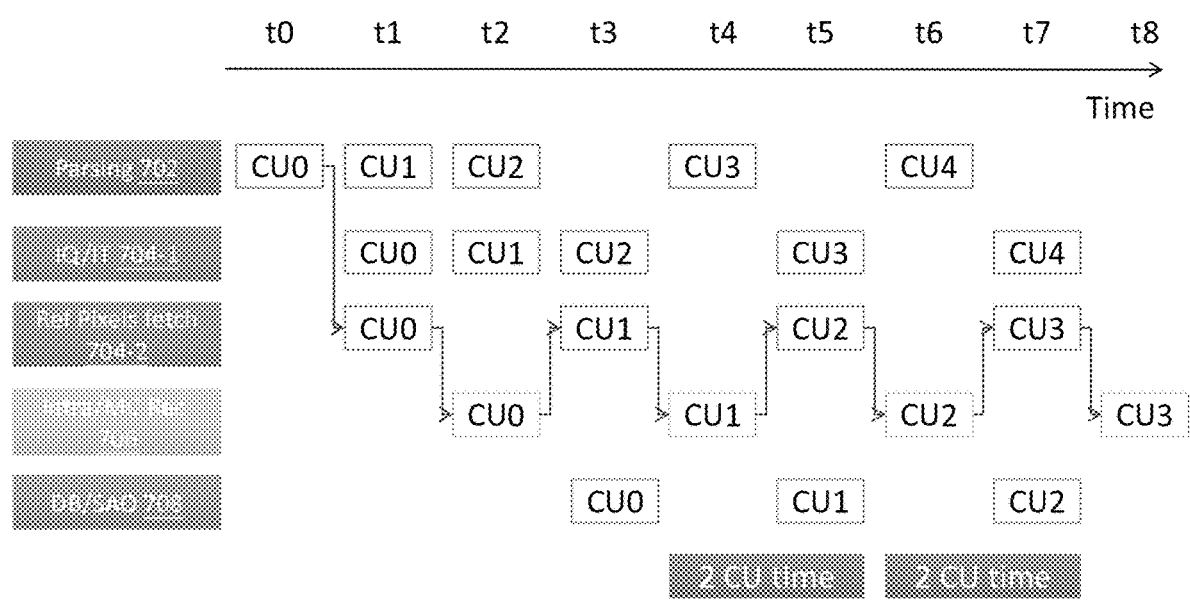
FIG. 8 shows an example of a decoder pipeline execution when executing a decoder-side predictor refinement tool.

FIG. 8 shows an example of a decoder pipeline execution when executing a decoder-side predictor refinement tool. For example, and using PMVD as an example, at time t2, since the MVs for CU0 depend on the PMVD searching process in the Intra/MC Reconstruction stage 706 (which is also performed at t2), the MVs cannot be reconstructed in the Parsing stage 702 for CU01 (at time t1), and so the data cannot be pre-fetched for CU1 at t2 at stage Ref Pixels fetch 704-2. This problem similarly affects the processing of each CU, and therefore results ultimately in only one CU processing finishing per two time slots. For example, FIG. 8 shows that for t4 and t5, the decoder only completes processing CU1, compared to FIG. 7, where CU1 completes processing at t4 and CU2 completes processing at t5.

The techniques disclosed herein address such data pre-fetch issues when decoder-side prediction refinement techniques (e.g., PMVD) are used for decoding. For example, the techniques allow the data to be pre-fetched in a manner that still hides the latency cycles, such as shown in FIG. 7, rather than causing a delay as shown in FIG. 8. For ease of illustration, the discussion below refers to PMVD as an example, although a person of skill can appreciate that the techniques can be adapted for other decoder-side prediction refinement techniques (e.g., BIO and DMVR).

According to some embodiments, the original candidate MV is preserved in the MV buffer for the next decoding process. In some examples, the selected merge candidate MVs (e.g., the starting, or unrefined MVs) are stored back to the MV buffers so that the decoder can reference the neighboring blocks and the collocated blocks/pictures. Therefore, according to some examples, the MC of the PMVD block (e.g., performed at the Intra/MC Reconstruction stage 706) uses the PMVD derived MVs, but the selected merge candidate MVs are stored back to the MV buffers for the future referencing. This can allow, for example, the MVs to be reconstructed in Parsing stage 702, and the reference pixels can be pre-fetched at stage 704-2. If the current block is a PMVD coded block, a larger reference block (e.g., including the refinement search range) can be pre-fetched. Therefore, in some examples, the MV is not refined for the current block, but the decoder uses the refined MV for compensation.

In some examples, the decoder can be configured not to change the MV in the MV buffer. For example, the decoder can store the starting point (e.g., the starting MV(s)) in the MV buffer, and do the refinement to generate a refinement MV that is only used to generate motion compensation data, without changing the MV in the MV buffer. The MV buffers for the future referencing (e.g. the merge candidate list and AMVP candidate list generation) is not changed.

In some examples, the decoder can use a separate buffer for refinement. For example, the decoder can retrieve the starting MV, run PMVD and execute refinement without storing the refined MV in the original MV buffer—the decoder stores the refined MV in a temporal buffer.

In some examples, the decoder can signal a starting candidate for PMVD. For example, the decoder can signal a starting candidate index that is used to select a starting MV from a MV candidate list. This can be done, for example, so that the decoder knows which candidate out of the eleven candidates will be used as the starting candidate for PMVD. The decoder can first generate the eleven starting candidates, and the encoder can signal to the decoder which is best. This signaling can allow, for example, the decoder to skip template matching and to proceed right to the refinement since the decoder knows staring candidate (e.g., the decoder can perform refinement using template matching and the Diamond Search technique to refine the MV around the starting candidate). While the MV is will be refined by diamond search, in proposed method will only store the starting candidate, not the refined motion vector.

In some examples, for PMVD (e.g., including bilateral matching merge mode and template matching merge mode) the LIST_0 and LIST_1 MVs in merge candidates are used as starting MVs. In some examples, a best MV candidate can be implicitly derived by searching all these MVs. This can require a lot of memory bandwidth. In this example, the merge index for bilateral matching merge mode or template matching merge mode is signaled. The signaled merge index can indicate, for example, the best starting MVs in LIST_0 and LIST_1 in template matching merge mode, and the best two MV pairs (one is derived from the LIST_0 and the other is derived from the LIST_1) in bilateral matching merge mode. By signaling the merge index, the template matching step can be limited to, e.g., a refinement search around the signaled merge candidate. For bilateral matching, the decoder can perform cost estimation to select the best MV pair from the two MV pairs and perform the refinement search. For bilateral matching, if the merge candidate is a uni-directional MV, its corresponding MV in another list can be generated by using the mirrored (scaled) MV. In some embodiments, by using a predefined MV generating method, the starting MVs in LIST_0, LIST_1, and/or the MV pairs are known. The best starting MVs in LIST_0 and/or LIST_1, or the best MV pair are explicitly signaled to reduce the bandwidth requirement.

In some examples, when one merge index is signaled, the decoder can further utilize the selected MV to exclude or select some candidates in the first stage (PU-level Matching). For example, the decoder can exclude some MVs in the candidate list which are far from the selected MVs. As another example, the decoder can pick N MVs in the candidate list that are the most close to the selected MV but in different reference frames.

In some embodiments, if a starting candidate index is signaled for bilateral matching merge mode, the starting MV candidate might be a MV pair (one MV for LIST_0 and another MV for LIST_1). Two MV pairs are derived from the starting MV pair (e.g., one is derived from the LIST_0 MV and the other is derived from the LIST_1 MV). The decoder can be configured to test both LIST_0 and LIST_1 MV pairs, but only stores one MV pair. In some examples, the decoder can be configured to always store either LIST_0 or LIST_1 MV pair. For example, if the selected merge candidate MV (or said starting candidate MV) is a bi-predicted MV, the stored LIST_0 MV is the LIST_0 MV of the merge candidate MV and the stored LIST_1 MV is the mirrored MV of the LIST_0 MV. The decoder can evaluate the MV pairs in both lists, but only the LIST_0 MV and its mirrored MV are stored back. As another example, the stored LIST_1 MV is the LIST_1 MV of the merge candidate MV and the stored LIST_0 MV is the mirrored MV of the LIST_1 MV.

In some examples, the decoder can be configured store the one of LIST_0 or LIST_1 MV pair with the smaller delta picture order count (POC). For example, if the POC difference between the LIST_0 reference picture and the current picture is smaller than (or equal to) the POC difference between the LIST_1 reference picture and the current picture, the stored LIST_0 MV is the LIST_0 MV of the merge candidate MV and the stored LIST_1 MV is the mirrored MV of the LIST_0 MV. Otherwise, the stored LIST_1 MV is the LIST_1 MV of the merge candidate MV and the stored LIST_0 MV is the mirrored MV of the LIST_1 MV.

If the selected merge candidate MV is a uni-predicted LIST_0 MV, the stored LIST_0 MV is the LIST_0 MV of the merge candidate MV and the stored LIST_1 MV is the mirrored MV of the LIST_0 MV. If the selected merge candidate MV is a uni-predicted LIST_1 MV, the stored LIST_1 MV is the LIST_1 MV of the merge candidate MV and the stored LIST_0 MV is the mirrored MV of the LIST_1 MV.

In some embodiments, when bilateral matching mode is applied, the decoder can be configured to only test one of LIST_0 or LIST_1 MV pair. For example, if the selected merge candidate MV is a bi-predicted MV, the decoder can be configured to only evaluate the LIST_0 MV pair. The PMVD starting LIST_0 MV is the selected merge candidate LIST_0 MV and the LIST_1 MV is the mirrored LIST_0 MV. In this example, the original LIST_1 MV is not evaluated in PMVD. In another example, when bilateral matching mode is applied and the selected merge candidate MV is a bi-predicted MV, the decoder can be configured to only use the LIST_1 MV pair. The PMVD starting LIST_1 MV is the selected merge candidate LIST_1 MV and the LIST_0 MV is the mirrored LIST_1 MV. In some examples, when bilateral matching mode is applied and the selected merge candidate MV is a bi-predicted MV, the decoder can be configured to only use the MV pair of the LIST with the reference picture that has smaller POC. For example, if the POC difference between the LIST_0 reference picture and the current picture is smaller than (or equal to) the POC difference between the LIST_1 reference picture and the current picture, the LIST_0 MV and its mirrored MV in LIST_1 is used. Otherwise, the LIST_1 MV and its mirrored MV in LIST_0 is used.

In some embodiments, to derive the reconstructed MVs in parsing stage, the decoder can be configured to not refer to the MVs of PMVD coded blocks. For example, in merge candidate derivation, the decoder can treat the PMVD coded blocks as, e.g., not available or as intra coded blocks. The PMVD derived MVs are not available in merge candidate derivation and AMVP candidate derivation. The MV reconstruction is independent to the PMVD. The MVs can be reconstructed in parsing stage.

In PMVD MV searching, a MV search method can be predefined (e.g., a three step diamond search). For example, for a diamond search, the step size of the first step diamond search is half of one pixel (half-pixel). The step size of the second step cross search is one quarter of one pixel (quarter-pixel). The step size of the third step cross search is ⅛ of one pixel (⅛ pixel). In some embodiments, both (a) the merge index of the staring MV and (b) a coarse grain MVD are signaled. The MVD can be the refinement position index of the first step diamond search, and/or a conventional MVD. The MVD unit can be 1/16-pixel, ⅛-pixel, quarter-pixel, half-pixel, one-pixel, two-pixel, or any predefined unit. The MVs of the selected merge index plus the signaled MVD (or the MV of the refinement position) can be used as the PMVD starting MV, which are stored into the MV buffer for merge candidate and AMVP candidate derivation referencing. In some examples, for the encoder and/or the decoder, the PMVD search can start from the PMVD starting MV. The final PMVD derived MV is only for the MC. The starting MVs of the PMVD coded block can be reconstructed in parsing stage.

In some examples, only one MVD, and/or only one MVD refinement position index, is signaled. If the merge candidate is a bi-predicted candidate, the MVD is added only on the LIST_0 or LIST_1. For bilateral matching merge mode, if the MVD is added on the LIST_0, the LIST_1 starting MV can be the mirrored MV of the LIST_0 starting MV.

In some examples, coarse grain MVD is not coded but derived in the search process at decoder. For example, we can partition the search process into three stages, the first step diamond search, the second step cross search, and the third step cross search. The coarse grain MVD can be the result of search process in the first step diamond search or the second step cross search.

In AMVP mode, the MVP and MVD are signaled for a PU. In some examples, the system can be configured to apply the PMVD for the AMVP mode. For example, an additional flag can be signaled for the AMVP PU to indicate whether the PMVD is applied (or not). The PMVD starts from the signaled MV of the AMVP mode, e.g., such that the starting MV is signaled by AMVP mode (e.g., rather than a candidate list). The PMVD refinement range can be restricted to be smaller than the unit/granularity of the MVD. In some examples, if the PMVD is applied, the MVD is in a coarser granularity than the normal AMVP mode. For example, the MVD granularity is changed to half-pixel or integer-pixel. The PMVD refinement range is restricted to be smaller than +-half-pixel or +-one-pixel. In some examples, the PMVD flag can be signaled in CU-level, CTU-level, some predefined area-level, slice-level, picture-level, or sequence-level. If the PMVD flag is signaled in CTU-level and the flag is true, the PMVD is applied to all the AMVP mode coded PU in the CTU. For the predefined area-level, the PMVD flag is signaled for the CU/PU larger than or equal to the predefined area. This flag can also be shared for the CU/PU smaller than the predefined area.

To address the pre-fetch issue, the PMVD derived MVs can only be used for MC. The signaled MVs (MVP+MVD) can be stored in the MV buffer for referencing.

In HEVC, a picture is divided into coding tree units (CTUs), which are the basic processing unit for HEVC. The CTUs are coded in raster scan order. In a pipelined decoder architecture, most information of the upper CTU rows is available in parsing stage (e.g., including the MV information) since the row was already processed. In some examples, the decoder-side derived MVs in CTUs from the upper CTU-row can be referenced (or used), for example, for merge candidate list and AMVP list generation, since the information is available in the parsing stage. The decoder can use the derived MVs in those CTUs even though the decoder-side derived MVs in current CTU-row cannot be used since they are not available.

Therefore, in some embodiments a CTU-row constraint can be used with the techniques described herein, such that the PMVD derived MVs in upper CTU-row can be referred to (e.g. when not referring to the MV of the PMVD coded block) or can be used (e.g. when storing the merge candidate MVs, storing the merge candidate MVs and mirrored MV, sending the merge index for PMVD and bilateral mirrored MV (and only evaluating one MV), signaling the merge index and coarse grain MVD, and/or AMVP mode and PMVD).

For example, consider the techniques discussed herein regarding when storing the merge candidate MVs, storing the merge candidate MVs and mirrored MV, and sending the merge index for PMVD and bilateral mirrored MV (and only evaluating one MV). When referring to the PMVD coded blocks in current CTU-row, the selected merge candidate MVs can be used for merge candidate derivation and AMVP candidate derivation. When referring to the PMVD coded blocks in upper CTU-row, the final PMVD derived MVs can be used.

As another example, consider the techniques discussed herein regarding not referring to the MV of the PMVD coded block. When referring to the PMVD coded blocks in current CTU-row, the MVs are not available for merge candidate derivation and AMVP candidate derivation. When referring to the PMVD coded blocks in upper CTU-row, the final PMVD derived MVs are used.

The CTU-row constraint can be changed to CTU constraint or any predefined or derived area constraint. For example, when not referring to the MV of the PMVD coded block, if the CTU constraint is applied, the MVs of PMVD coded blocks in the current CTU are not available while the MVs of the PMVD coded blocks in different CTUs are available.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
   receiving compressed video data related to a set of frames;
   deriving a first motion vector for a current block, wherein the first motion vector is an unrefined motion vector;
   calculating, using a decoder-side predictor refinement technique according to the first motion vector, a second motion vector, wherein the second motion vector is a refined motion vector for the current block;
   performing motion compensation for the current block according to the second motion vector that is the refined motion vector, but not the first motion vector that is the unrefined motion vector for the current block; and
   deriving a motion vector predictor for a second block different than the current block by using the first motion vector of the current block, but not the second motion vector that is the refined motion vector.

2. The decoding method of claim 1, wherein:
   calculating comprises:
   storing the second motion vector in a second motion vector buffer so that the first motion vector remains in a first motion vector buffer.

3. The decoding method of claim 1, comprising:
   deriving the unrefined motion vector comprising retrieving motion vectors for a set of neighboring blocks, comprising, for one or more neighboring blocks from the set of neighboring blocks, retrieving one or more first motion vectors associated with the neighboring block.

4. The decoding method of claim 1, comprising:
   determining data from one or more upper coding tree unit (CTU) rows are available; and
   deriving the unrefined motion vector comprising retrieving motion vectors for a set of neighboring blocks, comprising, for one or more neighboring blocks from the set of neighboring blocks:
       determining the neighboring block is in the one or more upper CTU rows; and
       retrieving one or more second motion vectors associated with the neighboring block.

5. The decoding method of claim 1, wherein calculating comprises:
   testing one or more motion vectors pairs derived from a first set of reference frames and a second set of reference frames; and
   storing only one of the one or more motion vector pairs associated with the first set of reference frames and the second set of reference frames.

6. The decoding method of claim 1, wherein calculating comprises:
   testing one or more vectors pairs derived from a first set of reference frames, or a second set of reference frames, but not both.

7. The decoding method of claim 1, further comprising:
   receiving a signal indicative of a starting candidate index for a starting motion vector candidate list; and
   using the received signal to derive the first motion vector.

8. The decoding method of claim 1, further comprising:
receiving a signal indicative of a starting candidate index for a starting motion vector candidate list, a coarse grain motion vector difference, or both; and
using the received signal to derive the first motion vector.

9. The decoding method of claim 1, further comprising:
receiving a signal from an advanced motion vector prediction indicative of a starting motion vector; and
using the received signal to derive the first motion vector.

10. An apparatus configured to decode video data, the apparatus comprising a processor in communication with memory, the processor being configured to execute instructions stored in the memory that cause the processor to:
receive compressed video data related to a set of frames;
derive a first motion vector for a current block, wherein the first motion vector is an unrefined motion vector;
calculate, using a decoder-side predictor refinement technique according to the first motion vector, a second motion vector, wherein the second motion vector is a refined motion vector for the current block;
perform motion compensation for the current block according to the second motion vector that is the refined motion vector, but not the first motion vector that is the unrefined motion vector for the current block; and
derive a motion vector predictor for a second block different than the current block by using the first motion vector of the current block, but not the second motion vector that is the refined motion vector.

11. The apparatus of claim 10, wherein:
calculating comprises:
storing the second motion vector in a second motion vector buffer so that the first motion vector remains in a first motion vector buffer.

12. The apparatus of claim 10, wherein the instructions further cause the processor to derive the unrefined motion vector comprising retrieving motion vectors for a set of neighboring blocks, comprising, for one or more neighboring blocks from the set of neighboring blocks, retrieving one or more first motion vectors associated with the neighboring block.

13. The apparatus of claim 10, wherein the instructions further cause the processor to:
determine data from one or more upper coding tree unit (CTU) rows are available; and
deriving the unrefined motion vector comprising retrieving motion vectors for a set of neighboring blocks, comprising, for one or more neighboring blocks from the set of neighboring blocks:
determining the neighboring block is in the one or more upper CTU rows; and
retrieving one or more second motion vectors associated with the neighboring block.

14. The apparatus of claim 10, wherein calculating comprises:
testing one or more motion vectors pairs derived from a first set of reference frames and a second set of reference frames; and
storing only one of the one or more motion vector pairs associated with the first set of reference frames and the second set of reference frames.

15. The apparatus of claim 10, wherein calculating comprises:
testing one or more vectors pairs derived from a first set of reference frames, or a second set of reference frames, but not both.

16. The apparatus of claim 10, wherein the instructions further cause the processor to:
receive a signal indicative of a starting candidate index for a starting motion vector candidate list; and
use the received signal to derive the first motion vector.

17. The apparatus of claim 10, wherein the instructions further cause the processor to:
receive a signal indicative of a starting candidate index for a starting motion vector candidate list, a coarse grain motion vector difference, or both; and
use the received signal to derive the first motion vector.

18. The apparatus of claim 10, wherein the instructions further cause the processor to:
receive a signal from an advanced motion vector prediction indicative of a starting motion vector; and
use the received signal to derive the first motion vector.

19. At least one non-transitory computer-readable storage medium encoded with a plurality of computer-executable instructions that, when executed, perform a method comprising:
receiving compressed video data related to a set of frames;
deriving a first motion vector for a current block, wherein the first motion vector is an unrefined motion vector;
calculating, using a decoder-side predictor refinement technique according to the first motion vector, a second motion vector, wherein the second motion vector is a refined motion vector for the current block;
performing motion compensation for the current block according to the second motion vector that is the refined motion vector, but not the first motion vector that is the unrefined motion vector for the current block; and
deriving a motion vector predictor for a second block different than the current block by using the first motion vector of the current block, but not the second motion vector that is the refined motion vector.

* * * * *